United States Patent [19]

Lee et al.

[11] Patent Number: 4,771,298

[45] Date of Patent: Sep. 13, 1988

[54] DROP-ON-DEMAND PRINT HEAD USING GASKET FAN-IN

[75] Inventors: Francis C. Lee, San Jose, Calif.; Ross N. Mills, Boulder, Colo.; Horst G. Mossbrugger, San Jose, Calif.; Gary V. Sturm, Lexington, Ky.

[73] Assignee: International Business Machine Corporation, Armonk, N.Y.

[21] Appl. No.: 908,497

[22] Filed: Sep. 17, 1986

[51] Int. Cl.[4] .............................................. G01D 15/16

[52] U.S. Cl. .................................................. 346/140 R

[58] Field of Search .......................................... 346/140

[56] References Cited

U.S. PATENT DOCUMENTS

| | | | |
|---|---|---|---|
| 3,747,120 | 7/1973 | Stemme | 346/75 |
| 3,988,745 | 10/1976 | Sultan | 346/140 |
| 4,392,145 | 7/1983 | Parkola | 346/140 |
| 4,449,135 | 5/1984 | Umezawa | 346/140 X |
| 4,460,906 | 1/1984 | Kanayama | 346/140 |
| 4,492,968 | 1/1985 | Lee et al. | 346/140 |
| 4,564,846 | 1/1986 | Siegal | 346/75 |
| 4,611,219 | 9/1986 | Sugitani | 346/140 |
| 4,623,904 | 11/1986 | Conta | 346/140 |
| 4,665,409 | 5/1987 | Behrens | 346/140 |

FOREIGN PATENT DOCUMENTS 101466 2/1980 Japan .

OTHER PUBLICATIONS

Durbeck et al.; Drop-On-Demand Nozzle Arrays With High Frequency Response, IBM TDB, vol. 21, No. 3, Aug. 1978, pp. 1210-1211.

*Primary Examiner*—Joseph W. Hartary
*Attorney, Agent, or Firm*—Otto Schmid, Jr.

[57] ABSTRACT

An ink jet drop-on-demand print head comprises a plurality of electromechanical transducers, and ink from a manifold is conveyed to the transducers. The fluid path between the transducers and the corresponding nozzle in the nozzle array comprises a resilient dual function means. The dual function means not only provides the fan-in section but also seals the fluid path in fluid tight relation without the use of any adhesive or bonding material.

10 Claims, 4 Drawing Sheets

DROP-ON-DEMAND PRINT HEAD USING GASKET FAN-IN

FIELD OF THE INVENTION

This invention relates to ink jet printing apparatus, and more particularly to ink jet printing apparatus in which ink drops are generated on demand in response to suitable electrical signals.

DESCRIPTION OF THE PRIOR ART

The structure of a matrix print head can be divided into two major assemblies, the actuator section which provides the driving force and the print element itself. For an ink jet drop-on-demand print head, the actuator is a small electromechanical transducer such as a cylindrical piezoelectric crystal and the print element is an orifice plate which supports the meniscus. Unfortunately, the scale of the actuator section is considerably larger than the print element section. As a consequence, a transition section is required to converge the larger scale spacing of the drivers to the smaller scale spacing of the print elements. This transition section is called a "fan-in".

The design of fan-in sections for ink jet drop-ondemand print heads conventionally falls into one of two categories. The first category is a monolithic design which results in a complete fan-in assembly, typically by a plastic molding or casting. An example of this type of fan-in is shown in U.S. Pat. No. 4,492,968 to Lee et al. Another example of this type of fan-in is U.S. Pat. No. 3,747,120 to Stemme. The second category is a bonded or layered design which requires two or more parts bonded together by welding or adhesives. An example of this type of fan-in is shown in U.S. Pat. No. 4,460,906 to Kanayama in which the components of the print head are welded together. Another example is U.S. Pat. No. 4,392,145 to Parkola which shows a multi-layer ink jet apparatus in which the layers are bonded together by an epoxy material. A third example of a multi-layer ink jet apparatus is U.S. Pat. No. 3,988,745 to Sultan which is assembled by screws or other fastening devices.

The prior art design of fan-ins has several drawbacks. First, both the monolithic and layered fan-ins are somewhat difficult to manufacture and in some cases the length of the fan-in is as long as the driver section. Both the monolithic and layered fan-in embodiments require precision parts having a fine surface finish such as that produced by lapping, for example. Precision parts mean added expense and, naturally, are to be avoided where possible. Probably the most important factor is that the addition of a long transition section between the driver and the nozzle section degrades the performance of the print head. Therefore, both the monolithic and layer fan-ins suffer from the same problems of manufacturability, size and reduced system response.

SUMMARY OF THE INVENTION

It is therefore the major object of this invention to provide an ink jet drop-on-demand print head which is compact in size and easy to manufacture and which produces greatly enhanced printer system performance.

According to the present invention, there is provided an ink jet drop-on-demand print head comprising a plurality of electromechanical transducers each having an entrance and an exit end. A marking fluid such as ink is converged from a fluid manifold to the entrance end of each of the transducers, and a resilient dual function means is connected in the fluid path from the exit end of each of the transducers to one of the nozzles in a nozzle array. The dual function means provides a fan-in section for each of the fluid paths comprising a folded passage having at least two angle bends and, in addition, a sealing of the fluid path from the transducers to the nozzles in a fluid tight relation.

A specific embodiment of a 9-channel print head is described in which the fluid paths converge radially through the fan-in sections. The dual function means is made from an elastomer such as fiber imbedded rubber, and the components of the print head can be assembled by screws, for example, without the use of any adhesive or bonding material.

A further embodiment utilizes a multiple layer fan-in so that a larger number of fluid channels can be provided in the print head.

BRIEF DESCRIPTION OF THE DRAWINGS

FIG. 5 is a section view which shows a multiple layer fan-in.

DESCRIPTION OF THE PREFERRED EMBODIMENTS

Figure 1:
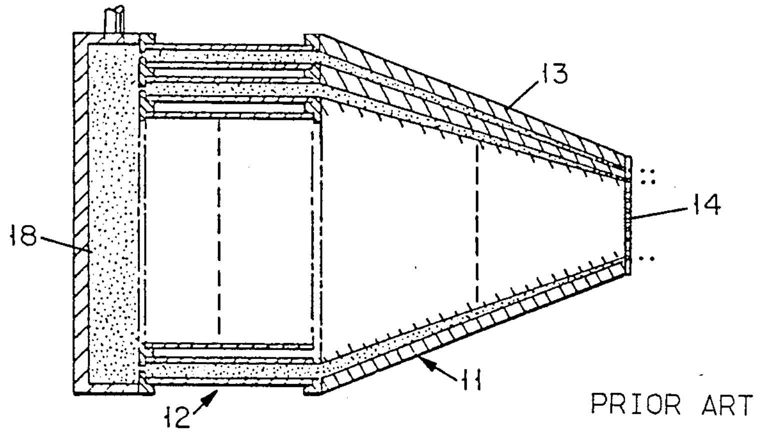
FIG. 1 is a section view of a prior art array of drop-on-demand ink jet print heads.

Before describing the present invention, reference is first made to FIG. 1 in which an embodiment of a prior art drop-on-demand ink jet printer is shown. FIG. 1 is a section view of a prior art array of drop-on-demand ink jet print heads. The print head array 11 comprises an actuator section 12 to which liquid ink is supplied from manifold 18. Actuator section 12 provides the driving force to project a drop of liquid ink from print element section 14 by means of the fluid path provided in fan-in section 13.

Figure 2:
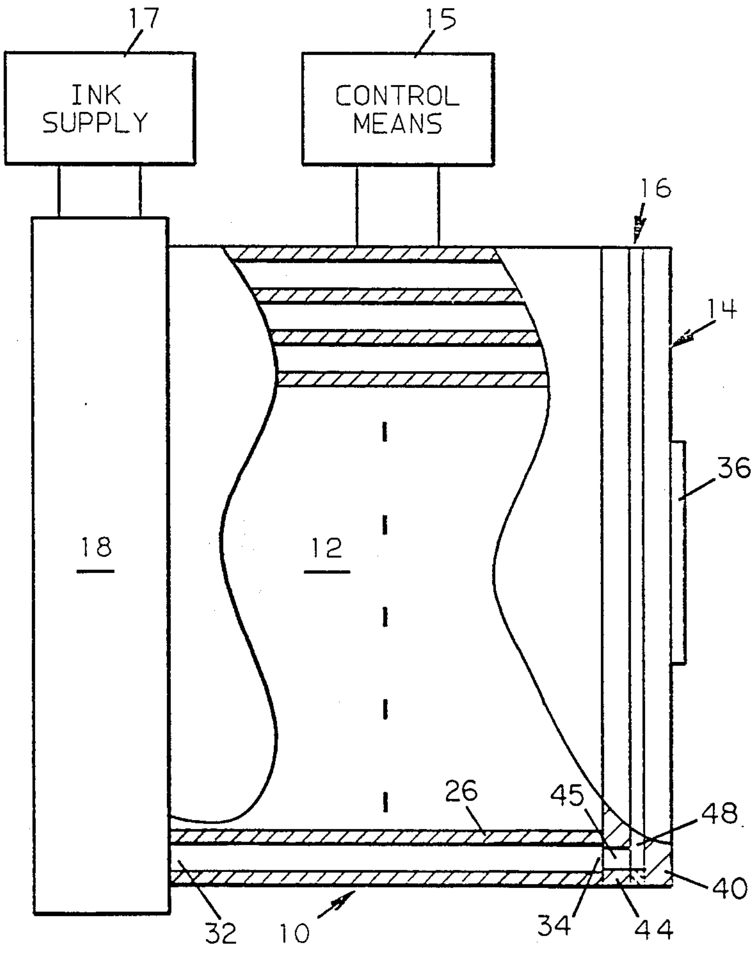
FIG. 2 is a right side view, partially in section, of an array of drop-on-demand ink jet print heads embodying the present invention

FIG. 2 shows a specific embodiment of an array of drop-on-demand ink jet print heads embodying the present invention. The print head 10 comprises an actuator section 12 to which a marking fluid such as liquid ink is supplied from ink supply means 17 through manifold 18. Actuator section 12 provides the driving force to project drops of liquid ink from print element section 14. Member 16 serves the dual function of not only providing the fan-in between the actuator section 12 and the print element section 14, but also sealing the ink flow path between the actuator section 12 and the print element section 14 in fluid tight relation.

In the embodiment of the invention shown in the drawings, (FIGS. 2–4), actuator section 12 comprises a plurality of piezoelectric tubes 26 which are held in position by a tube housing member 20. Tube housing member 20 can be a molded plastic part, for example, and the housing comprises a plurality of openings 22 into which the electromechanical transducers comprising piezoelectric tubes 26 provide a close fit. The piezoelectric tubes 26 are provided with electrodes (not shown) as is known in the art. When an electric pulse is applied to the electrodes of a tube 26 from control means 15, for example, the tube momentarily contracts and generates a pressure wave in the ink inside the tube. This pressure wave travels forward in the channel from the tube 26 and the forward traveling wave causes the ejection of a drop of ink when the pressure wave reaches the print element section 14.

In the embodiment of the invention shown in the drawings, the print element section 14 comprises an orifice plate 36 into which is formed a plurality of orifices or nozzles 38. Each of the orifices 38 is in alignment with one of the ink channels 48 which comes from the transducer section. The orifice plate substrate 40 merely provides support for the fragile orifice plate 36. The orifice plate 36 is permanently bonded to the substrate 40.

The dual function member 16 provides the ink path between the transducer section 12 and the print element section 14 and also seals the ink flow path between the actuator section 12 and the print element section 14. The member 16 comprises a subplate 44 having an opening 45 in alignment with the openings for piezoelectric tubes 26 and gasket member 46 has a slot 48, one end of which is aligned with the opening 45 in subplate 44 and the other end of the slot is aligned with the opening 35 in nozzle supporting plate 40. Gasket member 46 is made of a resilient material such as fiber-imbedded rubber, for example, so that the gasket can provide the dual function of sealing the ink flow path from the transducer section 12 to the print element section 14 as well as providing the fan-in from the transducer section 12 to the print element section 14.

The ink enters the entrance end 32 of the piezoelectric tubes 26 from manifold 18, proceeds through tubes 26 and out the exit end 34 of tubes 26. The ink proceeds through holes in gasket member 47 and through openings 45 in subplate 44. When the ink exits subplate 44, it makes a right angle turn and proceeds down slot 48 in gasket member 46 which comprises the actual fan-in. At the other end of slot 48, the ink makes another right angle bend and proceeds through orifice plate substrate 40 and then exits through orifice 38 in orifice plate 36.

Figure 4:
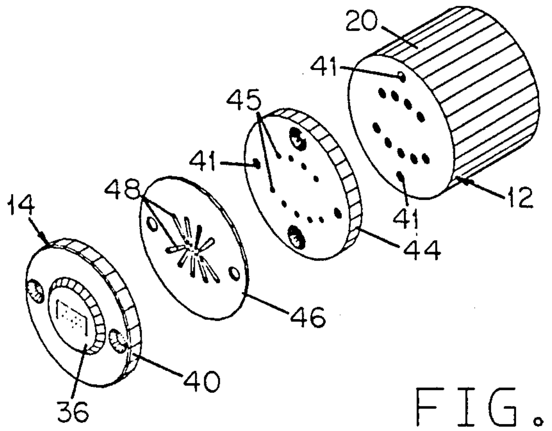
FIG. 4 is an exploded perspective view of the actuator section, the fan-in and the print element section for a specific embodiment of an array of drop-on-demand ink jet print heads embodying the present invention.

A specific embodiment of a 9-channel ink jet drop-on-demand print head is shown in FIG. 4. An exploded view of the transducer section, the fan-in section and the print element section is shown. The components of the print head can be assembled by means of screws in openings 41, for example, without the use of any adhesive or bonding material. The components of the print head can also be held together by the force of one or more clamp or clip. In this embodiment, the ink converges radially through the fan-in from the centers of the drive transducers 26 to the position of the orifices 38. In the embodiment the fan-in and the sealing gasket member 46 between the drive transducer 26 and the orifice plate substrate 40 are one and the same.

In contrast to prior art fan-in mechanism which required precision parts, the fan-in provided in this invention can be produced either in a stamping operation in the same manner as a simple gasket, or in a simple molding operation. The gasket member 46 is made from a resilient material that is chemically inert with respect to the ink, and is readily formable by punching, molding or equivalent techniques. In addition, the orifice plate substrate 40 and subplate 44, between which the gasket member 46 is constrained, must be acoustically rigid. Suitable materials for gasket member 46 include a polymer filled fiber gasket material and a fiber-imbedded rubber material which are suitable for forming by a punching operation. Suitable materials also include poly (tetra-fluroethylene) and Viton brand of synthetic rubber manufactured by E. I. DuPont de Nemours and Co. which are suitable for forming by molding.

It can be seen that the fan-in made in accordance with the present invention is not only simple to manufacture but the fan-in is also very compact. It is the same diameter as the transducer driver and, in a specific embodiment similar to that shown in FIG. 4, the thickness was about 0.5 mm. The fluid path length was short, on the order of 2–3 mm. These characteristics combine to produce a print head with a broad frequency response and with minimum drive requirements.

Figure 5:
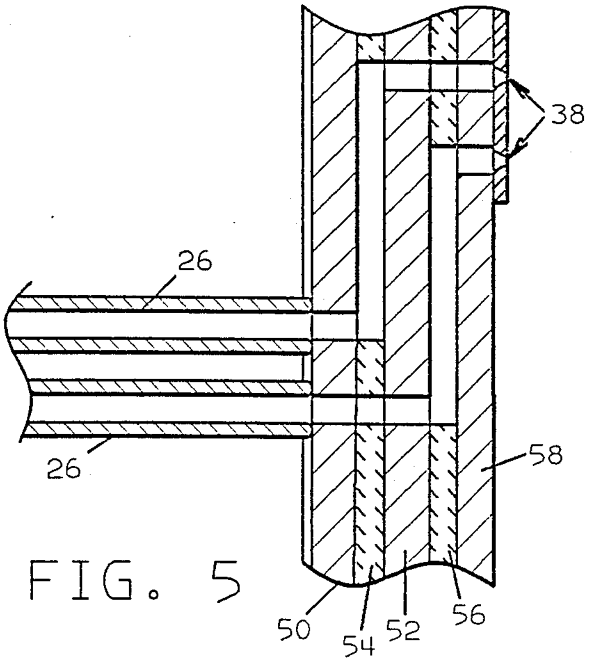
Figure 6:
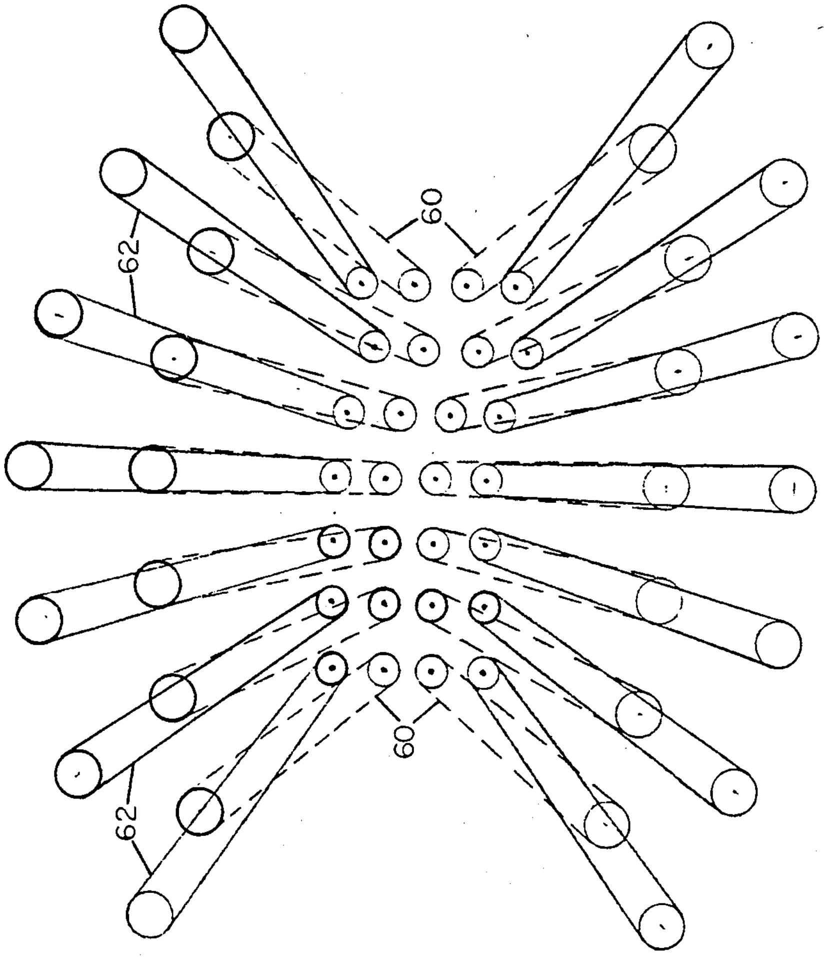
FIG. 6 is a right side plan view of the multiple layer fan-in of FIG. 5.

As the number of fluid channels increases, the radial dimension of the fan-in also increases in order to maintain separation between the fluid channels and this factor represents a limitation on the number of channels that can be conveniently provided. One way to avoid this limitation is to use a multiple layer fan-in. This concept is shown in FIGS. 5 and 6. FIG. 5 represents a cross-section of a two-layer gasket member fan-in. In this case two subplates 50, 52 are utilized with the first gasket fan-in member 54 positioned between the two separator plates and the second gasket fan-in member 56 positioned between the second separator plate 52 and the nozzle support plate 58. FIG. 6 is a top view of the same two layer fan-in assembly and in this view the fan-in gasket slots 60 of the first gasket fan-in member 54 are shown in dashed lines and the fan-in gasket slots 62 in the second fan-in gasket member 56 are shown in solid line.

From the showing of the two-layer fan-in of the drawings, it is evident that further variations could also be used. For example, one could use an assembly with more than two layers of fan-ins. Also, additional bends could be introduced into the folding process. This technique could be used to adjust for equal path lengths throughout the various fan-in layers.

Figure 3A:
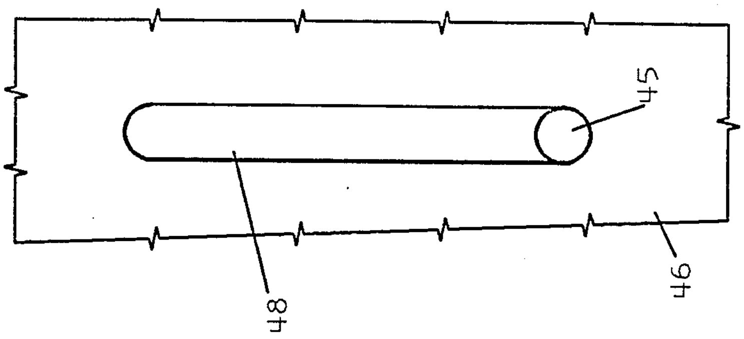
FIG. 3A is a partial section view taken along line A—A of FIG. 3.
Figure 3:
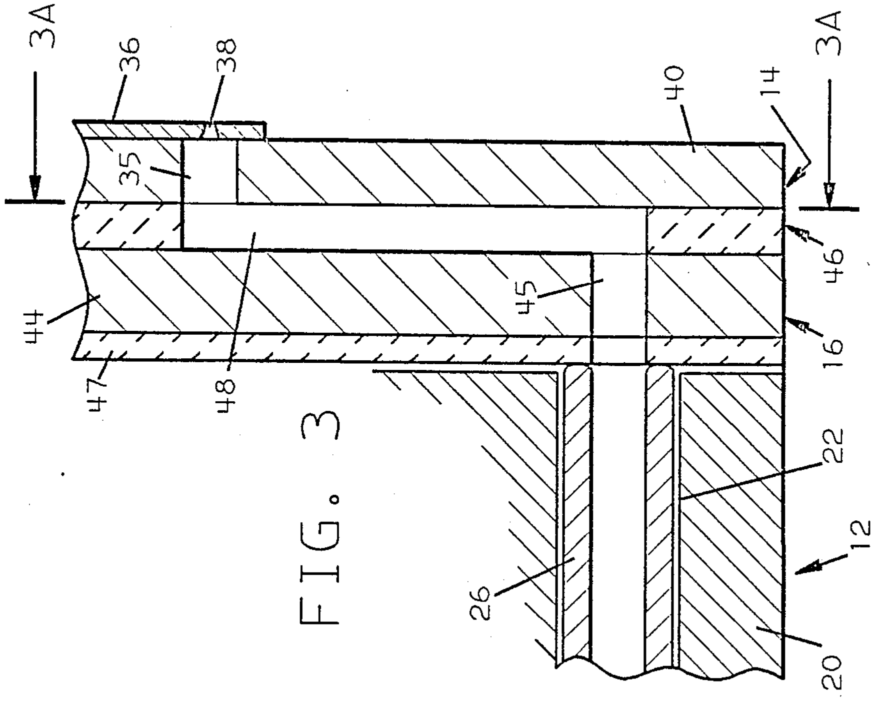
FIG. 3 is a partial section view taken along line 3—3 of FIG. 2 which shows a single fluid channel.

A drop-on-demand ink jet print head similar to that shown in FIGS. 2, 3 and 4 was built and tested. The characteristics of the print head which incorporates the fan-in comprising the present invention are a broad response with good high-frequency performance, low drive requirements, small sized rugged construction, and a modular design which is easily manufacturable.

While the invention has been particularly shown and described with reference to the preferred embodiments thereof, it will be understood by those skilled in the art that various other changes in the form and details may be made therein without departing from the spirit and scope of the invention.

Having thus described our invention, what we claim as new, and desire to secure by Letters Patent is:

1. An ink jet drop-on-demand print head array comprising:

a first and a second plurality of electromechanical transducers, each having an entrance and an exit end;

a fluid manifold;

means for conveying marking fluid from said manifold to the entrance end of each of said transducers;

a nozzle array having one nozzle for each of said transducers;

a first resilient dual function means connected in a substantial length of the fluid path between the exit end of said first plurality of transducers and one of said nozzles; and a second resilient dual function means connected in the fluid path between said second plurality of electromechanical transducers and one nozzle of said nozzle array, each of said dual function means providing a fan-in section for each of said fluid paths comprising a folded passage having at least two angle bends and, in addition, a sealing of said fluid path in a fluid tight relation.

2. The ink jet drop-on-demand print head array of claim 1 wherein said resilient dual function means comprises a polymeric material.

3. The ink jet drop-on-demand print head array of claim 2 wherein said resilient dual function means comprises an elastomer.

4. The ink jet drop-on-demand print head array of claim 3 wherein said resilient dual function means comprises a fiber-imbedded rubber.

5. The ink jet drop-on-demand print head of claim 1 wherein each of said resilient dual function means comprises a flat member having a predetermined thickness; and a plurality of elongated slots formed in said member which extend through the entire thickness of said member, each of said slots being positioned so that each end of said slot forms one of the angled bends of said folded passage between one of said transducers and one of said nozzles.

6. An ink jet drop-on-demand print head array comprising:

a first and a second plurality of electromechanical transducers, each of said electromechanical transducers having an entrance and an exit end;

a fluid manifold;

means for conveying marking fluid from said manifold to the entrance end of each of said transducers;

a nozzle array having one nozzle for each of said transducers; and first and second resilient dual function means connected in a substantial fluid path between the exit end of said transducers and one of said nozzles, the first of said dual function means providing a through path from the exit end of each of said first plurality of transducers and a fan-in section for each of said second plurality of transducers, said second dual function means providing a fan-in section from the exit end of each of said first plurality of transducers and a through path from the fan-in section of said second plurality of transducers, each of said fluid paths comprising a folded passage having two right angle bends, said dual function means providing, in addition, a sealing of each of said fluid paths in a fluid tight relation.

7. The ink jet drop-on-demand print head array of claim 6 wherein said resilient dual function means comprises a polymeric material.

8. The ink jet drop-on-demand print head array of claim 7 wherein said resilient dual function means comprises an elastomer.

9. The ink jet drop-on-demand print head array of claim 8 wherein said resilient dual function means comprises a fiber-imbedded rubber.

10. The ink jet drop-on-demand print head of claim 6 wherein each of said resilient dual function means comprises a flat member having a predetermined thickness; and a plurality of elongated slots formed in said member which extend through the entire thickness of said member, each of said slots being positioned so that each end of said slot forms one of the angled bends of said folded passage between one of said transducers and one of said nozzles.

* * * * *

UNITED STATES PATENT AND TRADEMARK OFFICE

CERTIFICATE OF CORRECTION

PATENT NO. : 4,771,298

DATED : September 13, 1988

INVENTOR(S) : Lee et al.

It is certified that error appears in the above-identified patent and that said Letters Patent is hereby corrected as shown below:

<u>IN THE CLAIMS</u>

Column 6, line 6, after "in a substantial", insert -- length of the --.

Signed and Sealed this

Twenty-first Day of February, 1989

*Attest:*

DONALD J. QUIGG

*Attesting Officer* *Commissioner of Patents and Trademarks*